United States Patent [19]

Meier

[11] Patent Number: 5,456,017
[45] Date of Patent: Oct. 10, 1995

[54] ADJUSTABLE HOLDER FOR THE FINE ADJUSTMENT OF A DIAL GAUGE

[75] Inventor: Daniel Meier, Mutschellen, Switzerland

[73] Assignee: Tekusa AG, Switzerland

[21] Appl. No.: 656,142

[22] PCT Filed: Apr. 2, 1990

[86] PCT No.: PCT/CH90/00086

§ 371 Date: Mar. 18, 1991

§ 102(e) Date: Mar. 18, 1991

[87] PCT Pub. No.: WO90/14573

PCT Pub. Date: Nov. 29, 1990

[30] Foreign Application Priority Data

May 18, 1989 [CH] Switzerland .................. 1864/89

[51] Int. Cl.$^6$ .................................................. G01B 3/22
[52] U.S. Cl. .......................... 33/572; 33/832; 248/904
[58] Field of Search .................. 33/792, 803, 832, 33/833, 533, 572; 73/866.5; 248/904, 124, 125, 286

[56] References Cited

U.S. PATENT DOCUMENTS

| 2,219,037 | 10/1940 | Street | 248/904 |
|---|---|---|---|
| 2,307,831 | 1/1943 | Emery | 33/572 |
| 2,516,053 | 7/1950 | Farkas | 248/904 |
| 2,909,351 | 10/1959 | Pratt | 248/904 |
| 3,442,478 | 5/1969 | Parapett | 33/833 |
| 3,477,675 | 11/1969 | Klink . | |
| 3,612,456 | 10/1971 | Palmer | 248/125 |
| 3,883,103 | 5/1975 | Bartolat | 248/124 |
| 4,439,925 | 4/1984 | Lock | 33/533 |
| 4,781,351 | 11/1988 | Parapetti | 248/904 |
| 4,896,857 | 1/1990 | McCullough | 248/904 |

FOREIGN PATENT DOCUMENTS 119275 12/1944 Australia .................. 248/124

Primary Examiner—Thomas B. Will
Attorney, Agent, or Firm—Speckman, Pauley & Fejer

[57] ABSTRACT

A dial gauge adaptor having a single shaped part forming two elastically connected legs. One leg is longer than the other one and overlaps it at its end. The tip of the longer leg is designed to receive a dial gauge, while the adaptor itself can be attached to a stand by its other end, at the base of the two legs. An adjustment rocker acting as a toggle lever is located between the two legs of the adaptor. The rocker is displaced at its longer lever end by a ball beating forming the end of a fine adjustment screw.

16 Claims, 2 Drawing Sheets

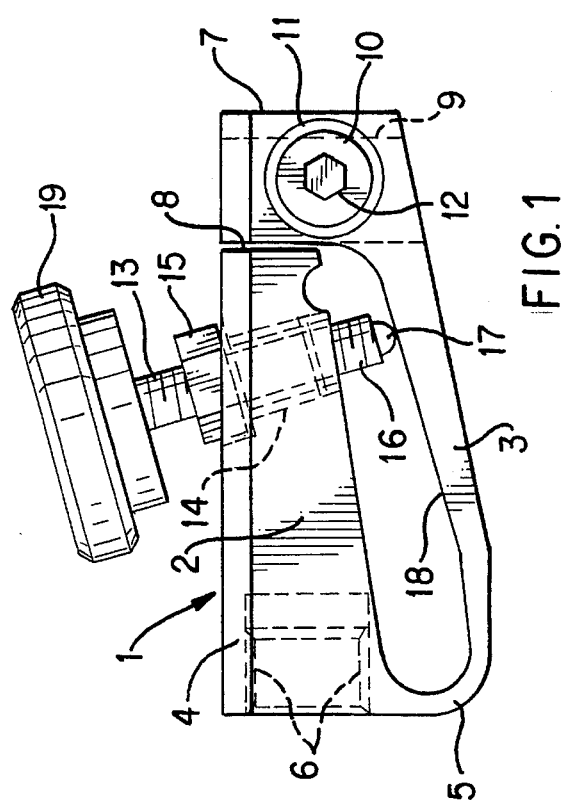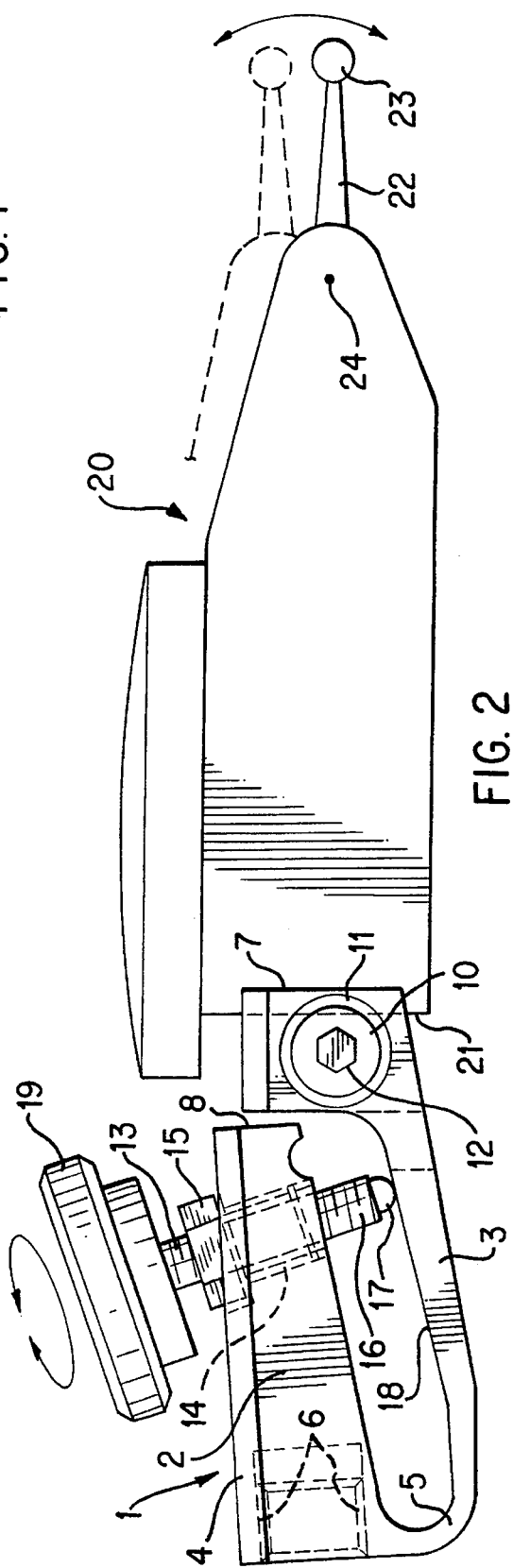

ADJUSTABLE HOLDER FOR THE FINE ADJUSTMENT OF A DIAL GAUGE

BACKGROUND OF THE INVENTION

1. Field of the Invention

The present invention relates to an adjustable dial gauge adaptor for the firm placing and fine setting of dial gauges. Dial gauges are primarily used for the measurement of precision mechanical constructions.

2. Description of Prior Art

Dial gauges are equipped with a moveable sensing lever. A sensitive, highly precise mechanical movement converts the displacement of the tip of the sensing lever into a value displayed on a dial or a digital display. The spherical tip of the sensing lever forms the contact point with respect to the object being measured. This tip must be brought into measuring position with very close tolerances and be held in place very firmly. The dial gauge is usually fastened to an articulated stand which allows a first, approximative positioning. Once it is positioned, the articulated stand can be locked, thus firmly holding the dial gauge in a position relatively close to the chosen reference point.

The dial is graduated in a positive and a negative direction from a zero setting. Before a measurement is made, the dial must be set to zero. This is done by a fine adjustment of a dial gauge adaptor. This adaptor is fastened to the tip of the articulated stand and holds the dial gauge in place. The purpose of the adaptor is to hold the dial gauge and to position it more precisely after the articulated stand is fixed, in order to set the dial to zero before proceeding with the measurement.

Conventional dial gauge adaptors have of two separate pieces forming two legs connected by a pin at a common axis. The legs are held in position with a tensed spring and their relative position can be changed with a fine adjustment screw. The one leg is firmly connected to the tip of the stand while the leg other can be moved relative to the first by adjustment of the fine adjustment screw which works against the force of the tensed spring. The dial gauge is fastened to this second leg of the adaptor and can thus be moved precisely into position.

The disadvantage of these conventional dial gauge adaptors is that a slight play results from the two-piece construction. This is evidenced by a hysteresis in the position of the dial gauge when it is moved back and forth. This play, especially in the lateral direction, occurs despite the most rigorous tolerances in the construction of the adaptor. Furthermore, a minimal play in the construction is necessary to prevent the two legs from getting jammed. In that case, a fine adjustment would be impossible, since the spring would not be able to overcome the resistance to movement of the joint.

The fine adjustment screw of the adaptor passes through the one leg and its rounded tip bears on the inner side of the other leg. In order to optimize the force ratios in the two-piece adaptor, the fine adjustment screw must be placed farthest away from the end at which the two legs are joined by the pin. The resulting large leverage allows a very fine adjustment and setting of the adaptor. This requirement, of placing the fine adjustment screw as far as possible from the joint, leads to relatively large dimensions for the legs of the adaptor and to a correspondingly reduced stability.

One dial gauge design is known, in which the legs form a single, shaped part. The part is thinner at the base of the legs, where they are joined. Thus the elasticity of the material can be used to act as a combination of the axis and the spring. The two legs first run parallel to each other, up to shortly before the end of the shorter leg. At that point, the longer leg forms a right angle and continues, over a length equal to that of the shorter leg, in a direction perpendicular to the shorter leg and away from it. This longer leg has a smooth face at the tip where it forms a right angle. A fine adjustment screw bears on this face in the unloaded position of the adaptor, when the legs are relatively close to each other. The fine adjustment screw passes through the the tip of the shorter leg at an angle of 45° to it. The base of the adaptor, where its two legs join, is fastened to the stand and the dial gauge is attached to the tip of the longer, angled leg of the adaptor.

Two disadvantages of the aforementioned design must be pointed out. First, the conical tip of the fine adjustment screw bears excentrically on a conical depression in the flat face of the longer leg at the beginning of its range of motion. As the two legs are moved apart, the tip of the fine adjustment screw moves along the side of the conical depression, toward its center. This is associated with large frictional forces at the contact point and considerable lateral forces on the leg being displaced by the setting of the adjustment screw. The resulting load on the screw leads to wear of the screw threads and consequently to an increased play in the movement. Secondly, the two legs form an equilateral triangle with their base. As a result, when the horizontally mounted adaptor is adjusted, the tip of the dial gauge moves not only up and down, but also forward, toward the object being measured. This causes a displacement of the dial gauge tip relative to the reference point on the object, and presents some difficulties for the exact positioning of the gauge.

SUMMARY OF THE INVENTION

One object for this invention is to develop a new, improved type of adaptor with a compact construction having a greater stability and less play, and allowing a more precise and yet simple positioning of the dial gauge.

The proposed object is achieved, according to this invention, by a new type of adjustable dial gauge adaptor for the fine setting of a dial gauge, including of a single shaped part formed into two legs and equipped with the means for attaching it to a stand as well as the means for fastening a dial gauge to it. This adaptor is characterized by its geometry: the shaped part is formed with the tip of the one leg overlapping the tip of the other leg in the prolongation of its axis in the unloaded position.

BRIEF DESCRIPTION OF THE DRAWINGS

Two preferred embodiments of the dial gauge adaptor according to the invention are shown in the accompanying diagrams. Their construction and their functioning are described in the following.

FIG. 1 is a side view of one embodiment of the dial gauge adaptor in an unloaded position;

FIG. 2 is a side view of the dial gauge adaptor according to FIG. 1 with an attached dial gauge in setting position.

DESCRIPTION OF PREFERRED EMBODIMENTS

Figure 3:
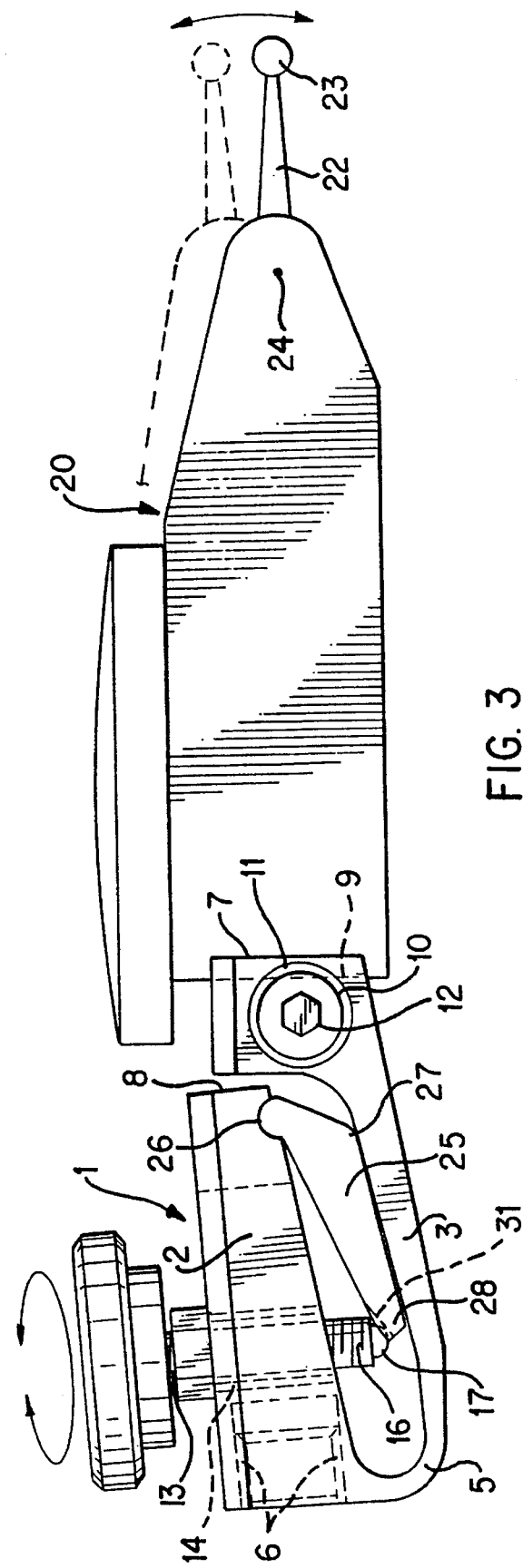
FIG. 3 is a side view of another preferred embodiment of the dial gauge adaptor with an attached dial gauge in a setting position.

FIG. 1 shows one preferred embodiment of the dial gauge adaptor according to this invention, characterized by a particularly simple construction. The adaptor comprises a single shaped part 1 forming two legs 2,3, one leg 2 which is shorter than the other leg 3. The shaped part 1 is basically, in its outer form, a trapezoidal prism. The flanks of the legs 2,3 are flat and parallel, and the other surfaces of the shaped part 1 are normal to the flanks. Only the upper edges 4 are chamfered and form an angle with respect to the flanks. The thinner section 5 connecting the two legs 2,3 and forming their base is thinner than either of the legs 2,5. The elasticity of the material can thus be used to form an elastic hinge at this thinner section 5 joining the two legs 2,3. The shorter leg 2 has a threaded hole 6 near its base at which the adaptor is fastened to the tip of the articulated support by means of a bolt. The axis of the threaded hole 6 is parallel to the main axis of the shorter leg 2. The other, longer leg 3 is thinner than the shorter leg 2, in order to keep the dimensions of the dial gauge adaptor as compact as possible. FIG. 1 shows a side view of the dial gauge adaptor in a unloaded position. "Unloaded" means the material is totally unstressed. In this position, the tip 7 of the longer leg 3 overlaps the tip 8 of the shorter leg 2 at its end and in the prolongation of its axis, i.e. the axis parallel to its longest dimension. In a preferred embodiment, the base of the legs 2, 3 is oriented at an angle of less than 10° with respect to the tips 7, 8 of the legs 2, 3, in the unloaded position of the adaptor. The tip 7 of the longer leg 3 is designed to receive the dial gauge. This construction, as illustrated in FIG. 2, makes it possible to fix the dial gauge in the prolongation of the tip of the arm of the articulated stand, and is one principal characteristic of the dial gauge according to this invention.

Placing the thinner section 5 forming the elastic hinge at the base of the two legs 2, 3 close to the threaded hole 6 by which the adaptor is attached to the stand is very advantageous: the axis about which the dial gauge rotates corresponds very closely with the tip of the arm of the stand on which it is mounted. Furthermore, the tip of the dial gauge is directly in the prolongation of the bolt holding the adaptor to the stand. This can be seen more clearly in FIG. 2.

The means for attaching the dial gauge 20 to the tip 7 of the longer leg 3 of the adaptor comprises a slot in the tip 7 of the longer leg 3 which runs in the plane of rotation of the legs 2,3 of the adaptor. The edge 9 of the slot, shown in FIG. 1 as a dotted line, has a negative dovetail shape. The slot is traversed by a transverse bolt 10 which pulls the two flanks of the slot together to fasten the dial gauge. The bolt has a hexagonal key head 12 bearing on a washer 11. The dovetailed mount of the dial gauge can thus be firmly clamped in the slot of the adaptor.

A fine adjustment screw 13 is set through the shorter leg 2. The screw 13 runs in a replaceable insert 14 which is itself threaded into the shorter leg 2. This insert 14 can be easily replaced when it starts showing signs of excessive wear. The tip 16 of the fine adjustment screw 13 is formed by a ball beating 17 which is firmly bonded to the adjustment screw 13. This ball bearing 17 forms the contact point between the tip of the adjustment screw 13 and the inner side 18 of the longer leg 3. A knob 19 of fairly large diameter and with a milled edge forms the head of the adjustment screw 13 and allows its precise setting. The diameter of the knob 19 is such that it can be comfortably manipulated with two or three fingers.

Turning the fine adjustment screw 13 to move it from its initial position, when the adaptor is unloaded, toward the longer leg 3 pushes the latter away from the shorter leg 2 thus tensing the spring formed by the base thinner section 5 of the legs 2,3. Despite the compact dimensions of the adaptor, the distance between the beating point 17 of the tip 16 of the adjustment screw 13 and the elastic hinge of the thinner section 5 formed by the base of the legs 2,3 remains relatively large, thus giving an advantageous lever arm. The restoring force of the elastic hinge of the thinner section 5 guarantees a firm contact between the ball bearing 17 forming the tip 16 of the adjustment screw 13 and the inner side 18 of the longer leg 3. The rotation of the longer leg 3 is absolutely free from play. The bah beating 17 at the tip of the fine adjustment screw 13 glides along the inner side 18 of the longer leg 3. The contact point of the ball bearing 17 moves toward the tip 7 of the leg 3 at large rotations.

The use of a ball bearing ensures that the contact between the tip of the adjustment screw 13 and the inner side 18 of the longer leg 3 occurs at a single point. The lateral forces on the adjustment screw are minimal. The lower loads result in less wear on the fine thread of the adjustment screw 13 and consequently in a longer lifetime and greater precision of the adjustment screw 13. Should the fine adjustment screw 13 have to be replaced, a replaceable insert facilitates the exchange.

The deformation of the dial gauge adaptor under stress is controlled principally by the width of the legs 2, 3. The stability of the adaptor is already much higher than that of two-piece designs, due to the absence of a rotating joint. This stability can be increased further by adapting the width of the legs 2,3. In the present design, this width is about one quarter of the overall length of the adaptor.

A final factor of great importance is the choice of material for the shaped part 1 of the adaptor. An appropriate choice for the present design would be a spring steel, hardened after its mechanical finish, and tempered to a nominal hardness.

The adaptor in a FIG. 1 is shown with a dial gauge in setting position in FIG. 2. The dial gauge 20 is mounted to the adaptor, its dovetailed mount 21 being clamped in the slot at the tip 7 of the longer leg 3. The top of the dial gauge 20, seen in a side view in FIG. 2, is equipped with an analog display similar to a watch face. A hinged sensing lever 22 forms the tip of the dial gauge. Its rotational axis is shown as point 24 in FIG. 2, the lever rotating in the plane of the diagram. Small displacements of the sensing lever 22 are transmitted to the display over a fine-tuned mechanical system. The tip 23 of the sensing lever 22 of the dial gauge is spherical, in order to form a clearly defined contact point with respect to the object being measured. The tip 23 of the sensing lever 22 is brought in contact with the reference point for the measurement by means of the dial gauge adaptor. The rotation of the whole dial gauge should correspond closely to the movement of the sensing lever 22. It is therefore important that the distance between the point at which the ball beating 17 at the tip of the fine adjustment screw 13 contacts the inner side 18 of the longer leg 3, and the tip of the longer leg 3 itself, and therefore the dial gauge, be as small as possible, in order to preserve the advantageous leverage obtained by the design of the adaptor, as described earlier. As can be seen clearly in FIG. 2, a rotation of the longer leg 3 entrains an exactly corresponding rotation of the sensing lever 22 in the same plane of rotation. This is one principal feature of the adaptor according to this invention. Another important feature is that the rotation of the dial gauge 20 by the adaptor does not cause any significant movement of the spherical tip 23 of the sensing lever 22 parallel to its axis. Two factors are considered for this feature. First, the thin, elastic hinge of the thinner section 5 of the dial gauge adaptor is nearly along the axis of the sensing lever 22. Secondly, this elastic hinge of the thinner section 5 is located at the farthest possible distance from the spherical tip 23 of the sensing lever 22. A setting reproducibility within $\frac{1}{100}$th of a millimeter can be achieved with the adaptor design shown in FIG. 2 and a top quality stand. The use of dial gauges with a micron-range precision proved the clearly superior performance of the present adaptor, as compared to conventional designs.

A yet much higher precision can be achieved with a second preferred embodiment of the adaptor according to this invention, as shown in FIG. 3. All embodiments described for the first preferred embodiment also apply for this second preferred embodiment. The principal difference lies in the highly improved leverage, which allows a much more precise setting of the adaptor, more specifically of the dial gauge tip 23, for a given rotation of the fine adjustment screw 13. This improvement in the setting precision is achieved by the placement of a fine adjustment rocker 25, acting as a toggle lever, between the two legs 2, 3 of the shaped part 1. The rotation axis of the rocker 25 corresponds to the axis of its cylindrical end 26. This cylindrical end 26 sits in a correspondingly machined groove in the inner side of the shorter leg 2. This groove can be either cylindrical, triangular or prismatic. In a side view, this fine adjustment rocker 25 is shaped more or less like a flattened triangle. The contact line 27 to the longer leg 3 is formed by the slightly rounded-off obtuse angle of this triangle. Mention is made of a contact line because the rocker 25 has the same width as the body 1 of the adaptor. The power leg 28 of the rocker 25 is clearly longer than the loading leg. This allows an additional increase of the leverage by a factor of 1:5. The fine adjustment screw 13 is set closer to the base thinner section 5 of the shorter leg 2 than in the first preferred embodiment. It traverses the shorter leg 2 at a right angle to the threaded hole 6 at its base, and the ball bearing forming its tip bears on the end of the power arm 28 of the fine adjustment rocker 25. In a preferred embodiment, an end portion of the power arm 28 forms an axial, triangular groove 31, which receives the ball bearing 17 of the fine adjustment screw 13. This preferred embodiment, with its increased leverage, has a smaller range of adjustment but also a much higher setting precision. This allows a highly precise and reproducible setting of the dial gauge 20 in the micron range. The fine adjustment rocker 25 is mounted in the body or shaped part 1 of the adaptor in a defined, slightly pre-stressed position, thus allowing measurements within the closest tolerances from the very start of the setting range.

I claim:

1. An adjustable dial gauge adaptor for finely setting a dial gauge (20), comprising: a single shaped part (1) forming two legs (2,3), means (6) for attaching said shaped part (1) to a stand, means for fastening (9–12) a dial gauge (20) to said shaped part (1), said shaped part (1) being formed in such a manner that a first tip (7) of one said leg (3) overlaps a second tip (8) of said other leg (2) in prolongation of an axis of said shaped part (1) in an unloaded position, said legs (2, 3) being rotatable relative to each other with an adjustment rocker (25) acting as a lever with a fulcrum (26) mounted on an inner side of said other leg (2), near said second tip (8).

2. An adjustable dial gauge adaptor according to claim 1, wherein said shaped part (1) forms, as an outer shape, a trapezoidal prism.

3. An adjustable dial gauge adaptor according to claim 2, wherein a base (5) of said legs (2,3) is oriented at an angle of less than 10° with respect to said first and second tips (7, 8) of said legs (2,3) in said unloaded position of the dial gauge adaptor.

4. An adjustable dial gauge adaptor according to claim 3, wherein said legs (2,3) can be rotated relative to each other with a fine adjustment screw (13) mounted through said other leg (2), and a ball bearing tip (17) of said fine adjustment screw (13) bears nearly perpendicularly on an inner side (18) of said one leg (3).

5. An adjustable dial gauge adaptor according to claim 4, wherein said fine adjustment screw (13) is set through said other leg (2) and said other leg (2) is shorter than said one leg (3).

6. An adjustable dial gauge adaptor according to claim 5, wherein said shaped part (1) has plane and parallel flanks, and a power arm of said adjustment rocker (25), which has a same width as said shaped part (1), and said power arm has an axial, triangular groove (31) cut in an inner power arm side of said power arm, such that a ball bearing (17) at a screw tip (16) of a fine adjustment screw (13) mounted through said other leg (2) bears on two points on corresponding edges of said triangular groove (31).

7. An adjustable dial gauge adaptor according to claim 6, wherein said ball bearing (17) is firmly bonded to said fine adjustment screw (13).

8. An adjustable dial gauge adaptor according to claim 7, wherein said fine adjustment screw (13) is threadedly engaged within a replaceable insert (14) which is mounted within said other leg (2).

9. An adjustable dial gauge adaptor according to claim 8, wherein said means (6) for attaching said shaped part (1) to said stand comprises a base of said other leg (2) having a threaded hole (6), and said means (9–12) for fastening said dial gauge (20) to the adaptor comprises said one leg (3) having a dovetail-shaped slot in said first tip (7) of said one leg (3) which runs in a plane of rotation of said legs (2,3) of the adaptor, and a transverse bolt (10) transversely mounted to pull two said flanks of said dovetail-shaped slot together to fasten said dial gauge (20).

10. An adjustable dial gauge adaptor according to claim 1, wherein a base (5) of said legs (2,3) is oriented at an angle of less than 10° with respect to said first and second tips (7, 8) of said legs (2,3) in said unloaded position of the dial gauge adaptor.

11. An adjustable dial gauge adaptor according to claim 1, wherein said legs (2,3) can be rotated relative to each other with a fine adjustment screw (13) mounted through said other leg (2), and a ball bearing tip (17) of said fine adjustment screw (13) bears nearly perpendicularly on an inner side (18) of said one leg (3).

12. An adjustable dial gauge adaptor according to claim 11, wherein said fine adjustment screw (13) is set through said other leg (2) and said other leg (2) is shorter than said one leg (3).

13. An adjustable dial gauge adaptor according to claim 1, wherein said shaped part (1) has plane and parallel flanks, and a power arm of said adjustment rocker (25), which has a same width as said shaped part (1), and said power arm has an axial, triangular groove (31) cut in an inner power arm side of said power arm, such that a ball bearing (17) at a screw tip (16) of a fine adjustment screw (13) mounted through said other leg (2) bears on two points on corresponding edges of said triangular groove (31).

14. An adjustable dial gauge adaptor according to claim 4, wherein said ball bearing (17) is firmly bonded to said fine adjustment screw (13).

15. An adjustable dial gauge adaptor according to claim 4, wherein said fine adjustment screw (13) is threadedly engaged within a replaceable insert (14) which is mounted within said other leg (2).

16. An adjustable dial gauge adaptor according to claim 1, wherein said means (6) for attaching said shaped part (1) to said stand comprises a base of said other leg (2) having a threaded hole (6), and said means (9–12) for fastening said dial gauge (20) to the adaptor comprises said one leg (3) having a dovetail-shaped slot in said first tip (7) of said one leg (3) which runs in a plane of rotation of said legs (2,3) of the adaptor, and a transverse bolt (10) transversely mounted to pull two flanks of said dovetail-shaped slot together to fasten said dial gauge (20).

* * * * *